United States Patent [19]
Koenig et al.

[11] Patent Number: 5,555,071
[45] Date of Patent: Sep. 10, 1996

[54] CAMERA WITH SELF-TIMER AND ELECTRONIC FLASH

[75] Inventors: Norbert Koenig, Rochester; Glenn Johnson, Webster, both of N.Y.

[73] Assignee: Eastman Kodak Company, Rochester, N.Y.

[21] Appl. No.: 282,994

[22] Filed: Jul. 29, 1994

[51] Int. Cl.[6] .............................. G03B 7/00; G03B 9/64; G03B 17/38; G03B 15/02
[52] U.S. Cl. .................. 354/418; 354/145.1; 354/238.1; 354/267.1; 354/127.12
[58] Field of Search ................ 354/418, 145.1, 354/238.1, 267.1, 127.12

[56] References Cited

U.S. PATENT DOCUMENTS

| | | |
|---|---|---|
| 4,751,545 | 6/1988 | Iguchi ........................... 354/468 |
| 4,841,318 | 6/1989 | Yamamoto et al. ............. 354/173.1 |
| 5,038,165 | 8/1991 | Amanuma et al. .............. 354/402 |
| 5,099,267 | 3/1992 | Satou et al. ..................... 354/412 |
| 5,146,259 | 9/1992 | Kobayashi et al. .............. 354/456 |
| 5,202,720 | 4/1993 | Fujino et al. ................... 354/415 |
| 5,220,364 | 6/1993 | Kobayshi et al. ............... 354/21 |
| 5,229,809 | 7/1993 | Wakabayashi et al. .......... 354/412 |
| 5,430,518 | 7/1995 | Tabata et al. ................... 354/267.1 |

*Primary Examiner*—Michael L. Gellner
*Assistant Examiner*—Matthew Miller
*Attorney, Agent, or Firm*—David A. Howley

[57] ABSTRACT

A camera includes a self-timer operable to delay picture taking for a predetermined interval and an electronic flash having a variable re-charge time. Operation of the self-timer is prevented when the predetermined interval is less than the re-charge time of the electronic flash.

9 Claims, 4 Drawing Sheets

CAMERA WITH SELF-TIMER AND ELECTRONIC FLASH

FIELD OF THE INVENTION

The invention relates generally to the field of photography, and in particular to cameras. More specifically, the invention relates to a camera having a self-timer and an electronic flash.

BACKGROUND OF THE INVENTION

U.S. Pat. No. 5,229,809 (the '809 patent) discloses a camera including a self-timer and an electronic flash. Several embodiments are shown in which the self-timer mode is entered and charging of the flash is commenced even when the flash cannot be fully charged within the time delay of the self-timer.

For example, the embodiment described in FIG. 9 of the '809 patent indicates that the shutter release is prohibited if the charging of the flash is not completed when the time counting of the self-timer is completed (col. 7, lines 1–3). Such an arrangement creates problems in that battery power is wasted and the operator expect that a self-timer picture will be taken when it will not be taken.

In the embodiment described in FIGS. 10A and 10B of the '809 patent, the time delay of the self-timer is extended for as long as it takes for the flash circuit to fully charge. If the batteries in the camera are weak, the amount of self-timer delay can become unacceptably long. During such a long delay, there may be a scene change (e.g. subject movement) which can degrade picture composition quality.

A further embodiment shown in FIGS. 12B and 12C of the '809 patent releases the shutter at the end of the self-timer delay regardless of another flash charging is complete or not (col. 8, lines 51–55). Obviously, such an arrangement can cause underexposed images to be recorded due to insufficient lighting of the scene.

SUMMARY OF THE INVENTION

The present invention is directed to overcoming one or more of the problems set forth above. Briefly summarized, according to one aspect of the present invention, a camera includes a self-timer operable to delay picture taking for a predetermined interval and an electronic flash having a variable re-charge time. Operation of the self-timer is prevented when the predetermined interval is less than the re-charge time of the electronic flash.

The camera described in the previous paragraph avoids exceptionally long delays between shutter button operation and picture taking when in the flash, self-timer mode. As a result, pictures of a poor subject composition are avoided. Further, it will be assured that the scene being photographed will be properly illuminated in the flash, self-timer mode.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
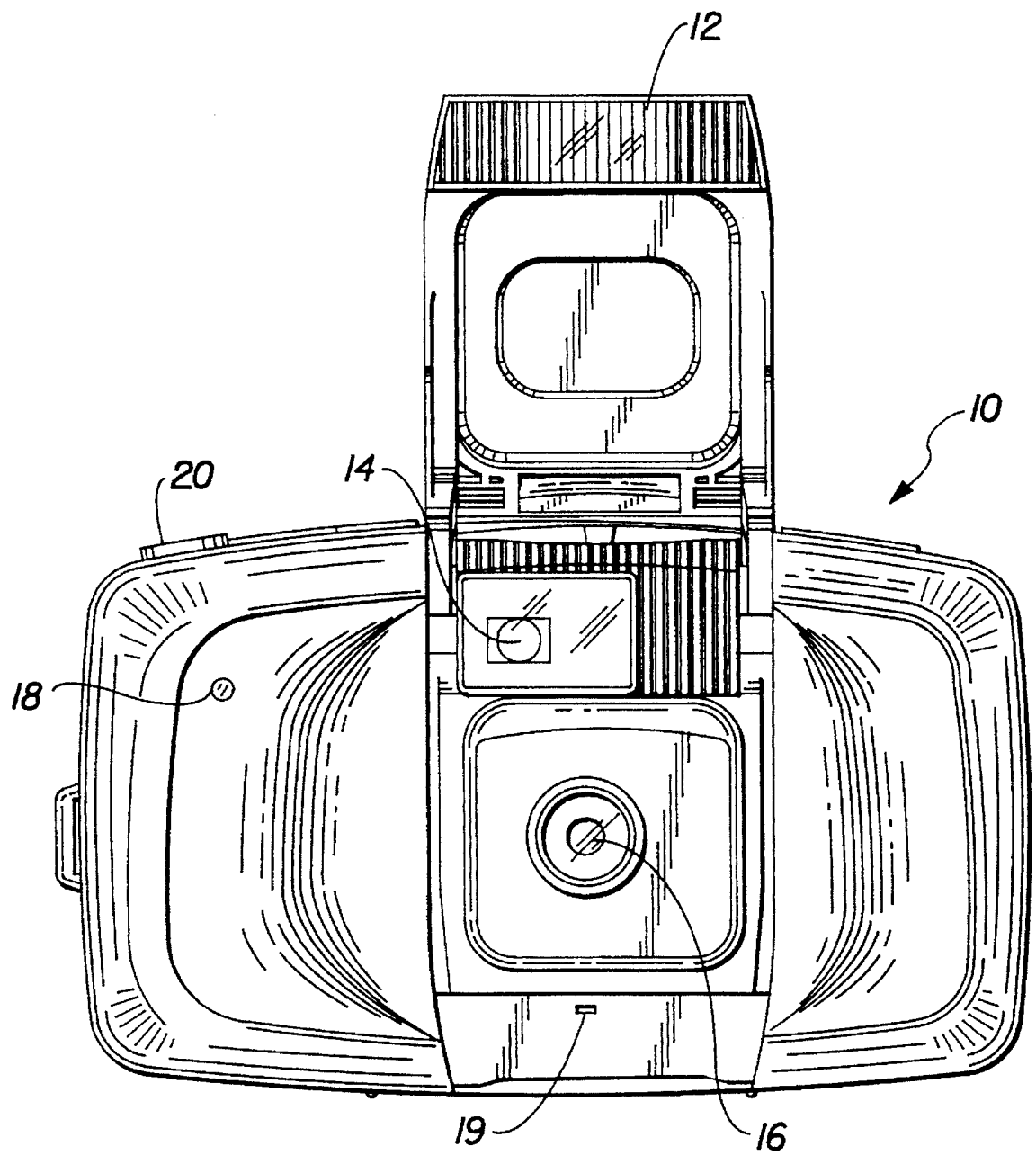
FIG. 1 is a front view of a typical camera in which the present invention can be used.
Figure 2:
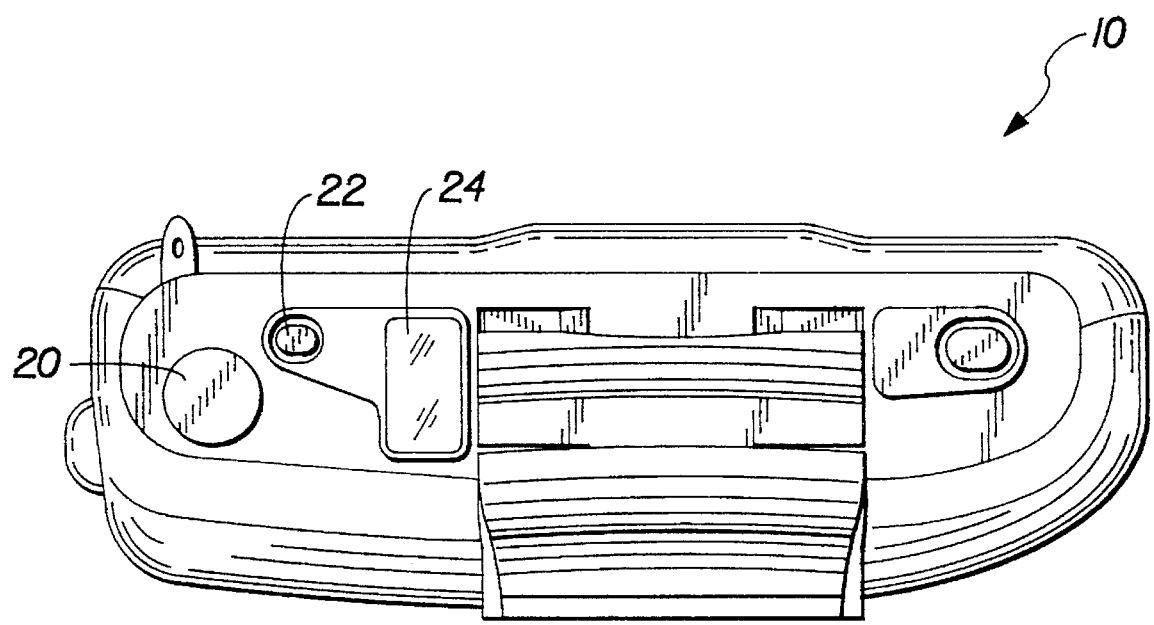
FIG. 2 is a top view of the camera of FIG. 1.

Beginning with FIGS. 1 and 2, a camera 10 includes an electronic flash 12, a viewfinder 14, an objective lens 16, a self-timer light-emitting diode (LED) indicator 18, a scene brightness measuring photosensor 19, a shutter button 20, a mode button 22 and a liquid crystal display (LCD) 24 for providing information to a camera operator such as frame count, selected mode, etc. Flash 12 includes a visible light emitter, such as a xenon tube, and a capacitor to store electrical energy from a camera battery. Flash 12 has a variable recharge time which depends on the strength of the camera's batteries. Relatively strong batteries provide relatively quick recharging while weak batteries take longer to charge the flash. The electrical energy stored in the capacitor is discharged through the xenon tube causing a brief, brilliant flash of visible light for illuminating a scene being photographed.

In order to record an image of a scene, an operator aims the camera by looking through viewfinder 14 and presses shutter button 20. Pressing shutter button 20 causes a shutter within camera 10 to momentarily open, thereby allowing light reflected from the scene to impinge on photographic film or an electronic sensor within the camera. The result is an image of the scene recorded on the film or sensor.

When a camera operator desires to be in the scene to be recorded, the camera operator successively presses mode button 22 until a self-timer icon appears on LCD 24. The camera operator then places camera 10 on a steady surface and aims the camera by observing the scene through viewfinder 14. When the scene is properly composed in the viewfinder, the operator presses the shutter button and positions himself into the scene. The camera will delay shutter actuation for typically about ten seconds to allow the operator to properly position himself in the scene. After the delay, the shutter is actuated to record an image of the scene including the camera operator.

Figure 3:
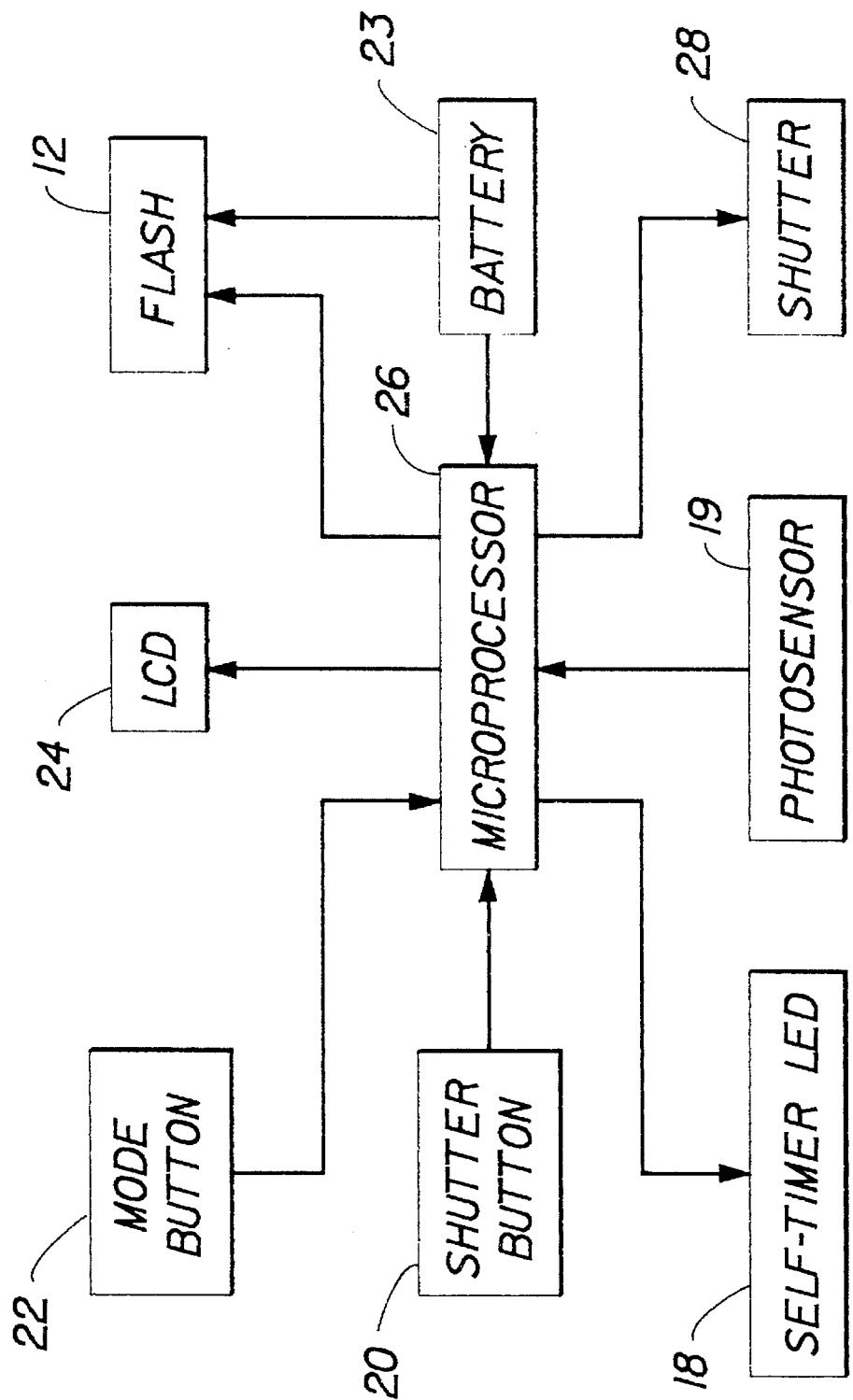
FIG. 3 is a block diagram representing various components in the camera of FIG. 1.

Turning to FIG. 3, a camera microprocessor 26 receives inputs from various parts of the camera such as shutter button 20, mode button 22, battery 23 and photosensor 19. Based on these and other inputs, microprocessor 26 controls the operation of various parts of the camera such as LCD 24, flash 12, self-timer LED 18 and a shutter 28. Microprocessor 26 includes a self-timer circuit, well known in the art, for delaying picture taking for a predetermined interval after the shutter button has been pressed. Microprocessor 26 also includes a battery voltage measuring circuit, well known in the art, for measuring the voltage of the camera's batteries.

Figure 4:
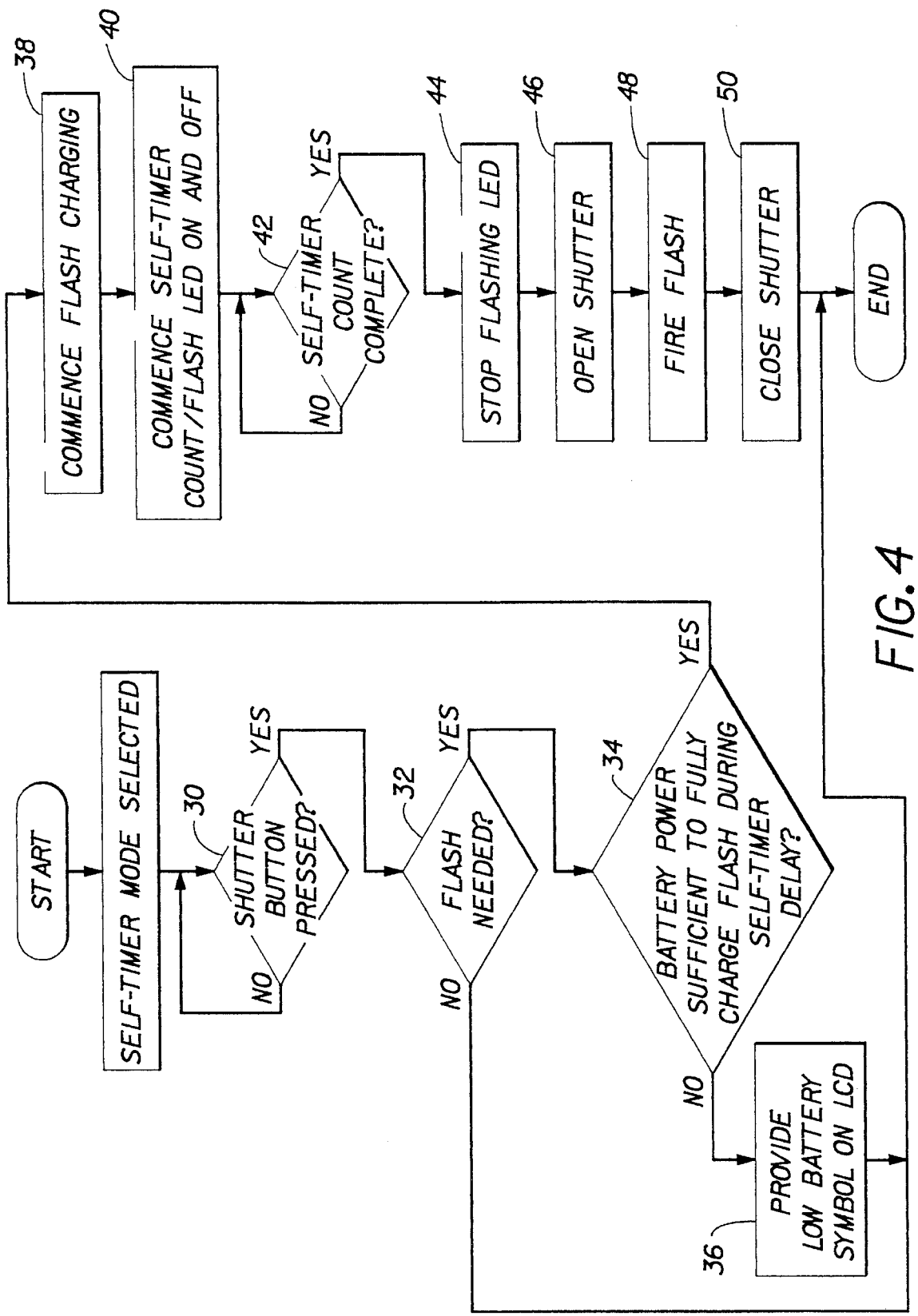
FIG. 4 is a logic flow diagram for the camera of FIG. 1 when the camera is operating in a self-timer mode.

With reference to FIG. 4, the logic and control utilized by microprocessor 26 to control operation of camera 10 in the self-timer mode will be described. At a step 30, microprocessor 26 checks to see if shutter button 12 has been operated to initiate the self-timer mode. If the shutter button has been operated, microprocessor 26 checks the output of photosensor 19 at a step 32 to determine whether or not the flash is needed to properly illuminate the scene.

If the flash is required, the microprocessor checks the battery voltage at a step 34 to determine whether or not the battery has power to sufficiently charge the flash during the self-timer delay. Battery power is checked by measuring the voltage on the battery. If the battery voltage is at or above a predetermined reference voltage (e.g. 2.4 volts), the microprocessor determines that the battery has power to sufficiently charge the flash capacitor within the self-timer delay period. If the battery voltage is below the predetermined reference voltage, the microprocessor determines that the battery has insufficient power to charge the flash capacitor within the self-timer delay period.

If there is insufficient battery power to sufficiently charge the flash during the self-timer delay interval, a low battery symbol is caused to be flashed on LCD 24 at a step 36 and operation of the self-timer mode is prevented from being actuated. If there is battery power to sufficiently charge the flash during the self-timer delay, flash charging is commenced at a step 38. Immediately after charging of flash 12 is commenced, a timing circuit in microprocessor 26 begins counting a predetermined period of time, such as ten seconds, at a step 40. Self-timer LED 18 is turned on to indicate that the self-timer count has begun. Preferably, LED 18 is flashed on and off at a first frequency for about eight seconds and then flashed on and off at a higher second frequency for the remaining two seconds of the count to indicate the imminence of picture taking.

At a step 42, microprocessor checks to see if the self-timer count has been completed. When the self-timer count is completed, the flashing of LED 18 is discontinued at a step 44 and shutter 28 is opened at a step 46. Flash 12 is fired to illuminate the scene at a step 48 afterwhich shutter 28 is closed at a step 50.

The invention has been described with reference to a preferred embodiment. However, it will be appreciated that variations and modifications can be effected by a person of ordinary skill in the art without departing from the scope of the invention.

PARTS LIST
10 Camera
12 Flash
14 Viewfinder
16 Objective Lens
18 Self-Timer LED
19 Photosensor
20 Shutter Button
22 Mode Button
23 Battery
24 LCD
26 Microprocessor
28 Shutter
30–50 Logic Steps

We claim:

1. A camera comprising a self-timer operable to delay picture taking for a predetermined interval, and an electronic flash having a variable recharge time, is characterized by:
    means for preventing operation of said self-timer when the predetermined interval is less than the recharge time of said electronic flash.

2. The camera of claim 1, wherein said preventing means includes means for checking a battery power in said camera such that said self-timer is prevented from operation when said battery power is not capable of recharging said electronic flash during said predetermined interval.

3. The camera of claim 2, further including means for checking a battery power in said camera such that said self-timer is allowed to operate when said battery power is capable of recharging said electronic flash during said predetermined interval.

4. The camera of claim 1, further including means for checking a battery power in said camera such that said self-timer is allowed to operate when said battery power is capable of recharging said electronic flash during said predetermined interval.

5. The camera of claim 1, further including means for indicating to a camera operator that the predetermined interval is less than the re-charge time of said electronic flash.

6. A camera comprising a self-timer operable to delay picture taking for a predetermined interval, and an electronic flash having a variable recharge time, is characterized by:
    means for preventing commencement of charging of said electronic flash when the predetermined interval is less than the re-charge time of said electronic flash.

7. The camera of claim 6, wherein said preventing means includes means for checking a battery power in said camera such that commencement of charging of said electronic flash is prevented when said battery power is not capable of recharging said electronic flash during said predetermined interval.

8. The camera of claim 7, further including means for checking a battery power in said camera such that commencement of charging of said electronic flash is allowed when said battery power is capable of recharging said electronic flash during said predetermined interval.

9. The camera of claim 6, further including means for checking a battery power in said camera such that commencement of charging of said electronic flash is allowed when said battery power is capable of recharging said electronic flash during said predetermined interval.

* * * * *